United States Patent [19]

Majewicz et al.

[11] 4,336,146
[45] Jun. 22, 1982

[54] METHOD OF THICKENING HEAVY BRINE SOLUTIONS

[75] Inventors: Thomas G. Majewicz, Chadds Ford, Pa.; Thomas J. Podlas, Newark, Del.

[73] Assignee: Hercules Incorporated, Wilmington, Del.

[21] Appl. No.: 180,743

[22] Filed: Aug. 25, 1980

[51] Int. Cl.$^3$ .......................... E21B 43/00; C09K 3/00
[52] U.S. Cl. ............................ 252/8.55 R; 166/244 R
[58] Field of Search ............. 252/8.5 A, 8.5 C, 8.55 R

[56] References Cited

U.S. PATENT DOCUMENTS

| | | | |
|---|---|---|---|
| 3,852,201 | 12/1974 | Jackson | 252/8.5 |
| 3,882,029 | 5/1975 | Fischer et al. | 252/8.55 |
| 4,175,042 | 11/1979 | Mondshine | 252/8.55 |

*Primary Examiner*—Herbert B. Guynn
*Attorney, Agent, or Firm*—William S. Alexander

[57] ABSTRACT

Thickening of heavy brine solutions based on calcium halides by use of water-insoluble hydroxyethyl cellulose is disclosed.

4 Claims, No Drawings

METHOD OF THICKENING HEAVY BRINE SOLUTIONS

This invention relates to the art of thickening solutions. More specifically, it relates to the art of thickening solutions containing relatively high concentration of salt. In its most specific embodiment, it relates to the thickening of solutions of brines containing calcium salts.

There are many occasions when it is desirable and even necessary to thicken aqueous systems containing more or less large quantities of salts dissolved therein. This is particularly the case in the petroleum industry where in many cases thick solutions must be prepared in the field where there is no fresh water available or where the solution desired must have a relatively high density and salts are used to impart this high density to the solution. A good example of this latter requirement is the so-called completion and work-over fluids which are used on many occasions to maintain a fluid head on a relatively deep well to prevent a blowout of pressurized gas or liquid around the bore of the drilling equipment. An aqueous solution of, usually, a calcium brine is employed for this purpose.

When the situation calls for thickening of plain water or of a relatively low density brine, there are a number of materials that can be used. For example, the water-soluble polysaccharides such as xanthan gum and modified cellulose derivatives are widely used in this application as are the water-soluble acrylamide polymers. However, when the situation demands a higher density brine, i.e., about 11 pounds per gallon (1.32 g./cc.) or greater, these polymers have proven to be not fully satisfactory inasmuch as they are relatively insoluble in brine at ambient temperature, and in order to build up any significant viscosity in such systems, they must be dissolved at elevated temperatures.

It is the object of this invention to provide a method of thickening (viscosifying) heavy brine solutions. It is a further objective to provide a series of such thickened brine solutions which are useful in all applications where thickened brines are required.

In accordance with this invention a method of thickening heavy brine solutions has been found which comprises dissolving therein, per barrel of brine, about 0.5 to 2 lbs. (about 225 to 910 g.) of a water-insoluble (i.e., less than about 1% soluble) cellulose derivative selected from the class consisting of hydroxyethyl cellulose having a hydroxyethyl M.S. of about 0.2 to 1.2 and methyl cellulose having a methyl D.S. of about 0.2 to 0.8. A barrel of brine contains 42 gallons or about 159 liters.

The method of the invention is applicable with all heavy brines based on calcium halide salts, i.e., those which have a density between about 11.5 and 19 lbs. per gallon (1.32 to 2.28 g./cc.). Within these limits are included calcium chloride brine, mixtures of calcium chloride with calcium bromide, straight calcium bromide brines and mixtures of calcium chloride, calcium bromide and other heavy salts such as, for example, zinc bromide and zinc chloride. All such brines have been found to be thickened by at least one of the materials meeting the polymer specification according to this invention. Brines of straight zinc bromide are also thickened by the materials of the invention, but such brines are relatively expensive and use thereof in the applications contemplated is not economically attractive in most cases.

The low substituted cellulose derivatives employed in the process of this invention are known materials which to date have found little or no commercial usage. The poor commercial acceptance of these products is based on their water insolubility. Even at relatively low concentrations, these materials in plain water, i.e., either tap water or distilled water, have been found to be almost totally insoluble, although they may absorb water and swell to some degree. Preferred low substituted cellulose derivatives are hydroxyethyl cellulose of 0.4 to 1.1 hydroxyethyl M.S. and methyl cellulose of 0.2 to 0.8 methyl D.S.

It has been most surprising to find that these materials are, in fact, relatively highly soluble in the aqueous brine systems specified in this invention. They are soluble at least to the level of 2 lbs./barrel (0.006 g/cc.) in calcium halide brines at room temperature. This is in marked contrast to the behavior of more traditional commercially available water-soluble cellulose derivatives, i.e., hydroxyethyl M.S. of about 1.5 and higher or methyl D.S. of about 1.6 or higher which, at room temperature, are usually only slightly soluble in these brines.

As has been stated hereinabove, the traditional water-soluble cellulose derivatives can be made to go into solution by raising the brine to an elevated temperature. However, the viscosity generated by the low substituted, water-insoluble cellulose derivatives, when dissolved at room temperature, is in most cases equal to or greater than the viscosity generated by the traditional water-soluble materials when dissolved at elevated temperatures in the same systems. Thus, in most cases it is possible to thicken a brine without heating it. Most of the preferred cellulose derivatives employed in the process of this invention can be dissolved in brine solutions at room temperature. However, it is also possible and sometimes it may be desirable that the cellulose derivative be dissolved at an elevated temperature. When the system containing the brine and the water-insoluble cellulose derivative is heated to an elevated temperature and then cooled back to room temperature, sometimes a higher viscosity results than that experienced when dissolving at room temperature. However, in most cases, heating is not necessary and is not recommended.

The preferred cellulose derivatives employed in this invention not only form high viscosity solutions at low temperature, they do so at a relatively rapid rate. This is another advantage of the invention over thickening procedures heretofore known. In many cases, viscosity buildup reaches substantially a maximum within sixty minutes after addition of the polymer to the brine solution and commencement of agitation. If it is desired to retard the dissolution rate for any reason, this can be done by treating the cellulose ether with borax. About 0.02 to 1% by weight of borax is sufficient to retard the dissolution for about 2 to 60 minutes, depending upon the dissolution temperature.

Another characteristic of the cellulose derivatives employed in the practice of this invention is that they do not exhibit a cloud point at elevated temperatures, at least up to the boil in brine solution. That is to say, they do not exhibit a tendency to come out of solution when they are heated as do some other cellulose derivatives, such as, for example, some of those which are hydroxypropylated. This is a useful characteristic when the thickened solution is employed in an oil well inasmuch as elevated temperatures are frequently encountered in the very deep wells which are being drilled today. The viscosity is, of course, reduced due to the high temperature but a substantial amount of viscosity is retained due to the polymer remaining in solution.

The polymers employed in the practice of this invention are prepared in the manner known to the art for the preparation of cellulose derivatives. Cellulose in raw form, which can be wood pulp, chemical cotton, cotton linters, or the like, is slurried in an aqueous caustic solution and swollen to form alkali cellulose which is then treated either in dry from or in the presence of an organic diluent with the appropriate etherifying agent until the proper substitution level is achieved. This technology is known and forms no part of the present invention.

EXAMPLES 1 TO 4

Specimens of hydroxyethyl cellulose of various substitution levels, including some water-soluble controls, were added slowly with vigorous agitation to brine solutions of various densities until completely dissolved. The HEC concentration in all cases was about 454 grams per barrel of brine.

Details on brine concentration, brine composition, HEC substitution level and viscosity of thickened solution are recorded in Table I.

TABLE I

| Brine Composition | $CaCl_2$ | | $CaBr_2$ | | $CaCl_2$***/$CaBr_2$ | | $ZnBr_a$/$CaBr_2$ |
|---|---|---|---|---|---|---|---|
| Brine Density** | 11 | 11.6 | 14.2 | 15.1 | 14 | 15.1 | 19.1 |
| Ex. No. | M.S. | | | ←—Viscosity*—→ | | | |
| $C_1$ | 2.0 | 42 | — | 65 | — | 7 | — | — |
| $C_2$ | 1.5 | 49 | 65 | 76 | 6 | 24 | — | 9 |
| 1 | 1.1 | 48 | 83 | 91 | 104 | 122 | 107 | 131 |
| 2 | 0.7 | 13 | 66 | 85 | 106 | 148 | 109 | 137 |
| 3 | 0.4 | 2 | 10 | 112 | 42 | 125 | 35 | 19 |
| 4 | 0.2 | 1 | 3 | 3 | 3 | 6 | 4 | 4 |

*cps. measured on Fann Viscometer at 300 r.p.m., solvent viscosity subtracted.
**Expressed as lbs./gallon (lbs./gallon × .11984 = g/cc)
***14 ppg is 56% solids - 33 parts $CaBr_2$; 23 parts $CaCl_2$
  15.1 ppg is 61% solids - 45 parts $CaBr_2$; 16 parts $CaCl_2$
  19.1 ppg is 76% solids - 53 parts $ZnBr_2$; 23 parts $CaBr_2$

EXAMPLES 5 TO 7

The procedure as in Examples 1 to 4 was repeated using methyl cellulose at the same concentration as the thickener. Results are recorded in Table II.

TABLE II

| Brine Composition | $CaCl_2$ | $CaBr_2$ | $CaCl_2/CaBr_2$ | $CaBr_2$ |
|---|---|---|---|---|
| Brine Density | 11 | 14.2 | 14 | 15.1 | 19.1 |
| Ex. No. | M.S. | | ←—Viscosity—→ | | |
| C | 1.6 | — | — | — | — | 115 |
| 5 | 0.8 | 1 | 79 | 97 | 72 | 159 |
| 6 | 0.5 | 1 | 59 | 128 | 179 | 167 |
| 7 | 0.2 | 1 | 61 | 110 | 152 | 124 |

What I claim and desire to protect by Letters Patent is:

1. A method of thickening heavy calcium halide salt brine solutions having a density between about 11.5 and about 19 pounds per barrel which comprises dissolving therein, per barrel of brine, about 0.5 to 2 lbs. of a cellulose derivative selected from the class consisting of hydroxyethyl cellulose having a hydroxyethyl M.S. of about 0.2 to 1.2 and methyl cellulose having methyl D.S. of about 0.2 to 0.8, said cellulose derivative being soluble in tap or distilled water to the extent of less than 1% by weight.

2. A method according to claim 1 wherein the cellulose derivative is hydroxyethyl cellulose having hydroxyethyl M.S. of about 0.4 to 1.1.

3. A method according to claim 1 wherein the cellulose derivative is methyl cellulose.

4. A thickened solution comprising a calcium halide-salt brine having a density between about 11.5 and about 19 pounds per barrel and having dissolved therein, per barrel of said brine, about 0.5 to 2 pounds of a cellulose derivative selected from the class consisting of hydroxyethyl cellulose having hydroxyethyl M.S. of about 0.2 to 1.2 and methyl cellulose having methyl D.S. of about 0.2 to 0.8, said cellulose derivative being soluble in tap or distilled water to the extent of less than 1% by weight.

* * * * *